US011836640B2

(12) United States Patent
Ji et al.

(10) Patent No.: US 11,836,640 B2
(45) Date of Patent: Dec. 5, 2023

(54) ARTIFICIAL INTELLIGENCE MODULES FOR COMPUTATION TASKS

(71) Applicant: Motorola Mobility LLC, Chicago, IL (US)

(72) Inventors: Zhengping Ji, Hinsdale, IL (US); Rachid M. Alameh, Crystal Lake, IL (US); Robert S. Witte, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 439 days.

(21) Appl. No.: 16/875,279

(22) Filed: May 15, 2020

(65) Prior Publication Data

US 2021/0357780 A1 Nov. 18, 2021

(51) Int. Cl.
*G06F 17/00* (2019.01)
*G06N 5/04* (2023.01)
*G06N 20/00* (2019.01)

(52) U.S. Cl.
CPC ............. *G06N 5/04* (2013.01); *G06N 20/00* (2019.01)

(58) Field of Classification Search
CPC ........ G06N 5/04; G06N 20/00; G06F 16/285; G06F 16/353; G06F 16/2455; G06F 18/2178; G06F 18/251; G06F 18/2148; G06F 9/4881; G06F 9/541; G06F 9/4843
USPC .......................................................... 706/11
See application file for complete search history.

(56) References Cited

U.S. PATENT DOCUMENTS

| 11,164,093 | B1* | 11/2021 | Zappella ................. G06N 5/045 |
| 2011/0131235 | A1* | 6/2011 | Petrou ................... G06F 16/532 707/769 |
| 2018/0204059 | A1* | 7/2018 | Antol ..................... H04L 67/535 |
| 2018/0349736 | A1* | 12/2018 | Bapat ..................... G06V 20/53 |
| 2019/0236417 | A1* | 8/2019 | Yun ..................... G06V 10/7788 |
| 2020/0043060 | A1* | 2/2020 | Fleischman ........... G06F 16/285 |
| 2020/0364583 | A1* | 11/2020 | Pedersen ................. G06N 3/02 |
| 2021/0042168 | A1* | 2/2021 | Bakulin ..................... G06F 8/36 |
| 2021/0224684 | A1* | 7/2021 | Sarkar ................... G06F 3/0638 |

OTHER PUBLICATIONS

"Network-attached storage—Wikipedia", Retrieved at: https://en.wikipedia.org/wiki/Network-attached_storage—on Feb. 18, 2020, 7 pages.
"Diskstation Manager", Retrieved at: https://www.synology.com/en-us/knowledgebase/DSM/video—on Feb. 18, 2020, 9 pages.
Brunelli, "What's the difference between a file server and a NAS device?", Retrieved at: https://www.carbonite.com/blog/article/2016/06/whats-the-difference-between-a-file-server-and-a-nas-device, Jun. 8, 2016, 6 pages.
Statz,"Set up a Home Server", Feb. 15, 2010, 14 pages.

* cited by examiner

*Primary Examiner* — Jason T Edwards
(74) *Attorney, Agent, or Firm* — FIG. 1 Patents

(57) ABSTRACT

Techniques for artificial intelligence (AI) modules for computation tasks are described, and may be implemented to enable multiple AI modules to be aggregated to form an execution structure (e.g., an execution chain) for performing a computation task. Generally, the described techniques aggregate AI modules based on their respective functions to perform an overall computation task.

20 Claims, 13 Drawing Sheets

ARTIFICIAL INTELLIGENCE MODULES FOR COMPUTATION TASKS

BACKGROUND

Artificial intelligence (AI) techniques are increasingly utilized to perform a variety of different computational tasks, such as image recognition, speech recognition, natural language processing, content generation, etc. While AI provides ways for automating performance of a multitude of different complex tasks, conventional AI techniques exhibit a number of implementation challenges. For instance, due to their complexity, AI algorithms are typically executed using cloud-based (e.g., network-based) systems that receive data for processing according to a requested task, process the data, and return processed data to a requesting entity (e.g., an edge device) over a network connection. While cloud processing benefits from attributes such as high computational and processing powers, processing speed, and large databases for training AI systems, cloud processing may suffer from excess data latency introduced by bidirectional transmission of data between an entity providing input data (e.g., an end user) and a cloud-based AI system that processes the data and returns resulting data. Further, cloud-based AI systems that utilize external network connections (e.g., the Internet) for data communication introduce risks that unauthorized parties may intercept and expose the data. For this reason end users are in general concerned due to fear of privacy risks when sensitive data leaves their devices. Thus, due to their system configurations, conventional AI systems may experience both performance and security challenges.

BRIEF DESCRIPTION OF THE DRAWINGS

Aspects of AI modules for computation tasks are described with reference to the following Figures. The same numbers may be used throughout to reference similar features and components that are shown in the Figures.

DETAILED DESCRIPTION

Figure 1:
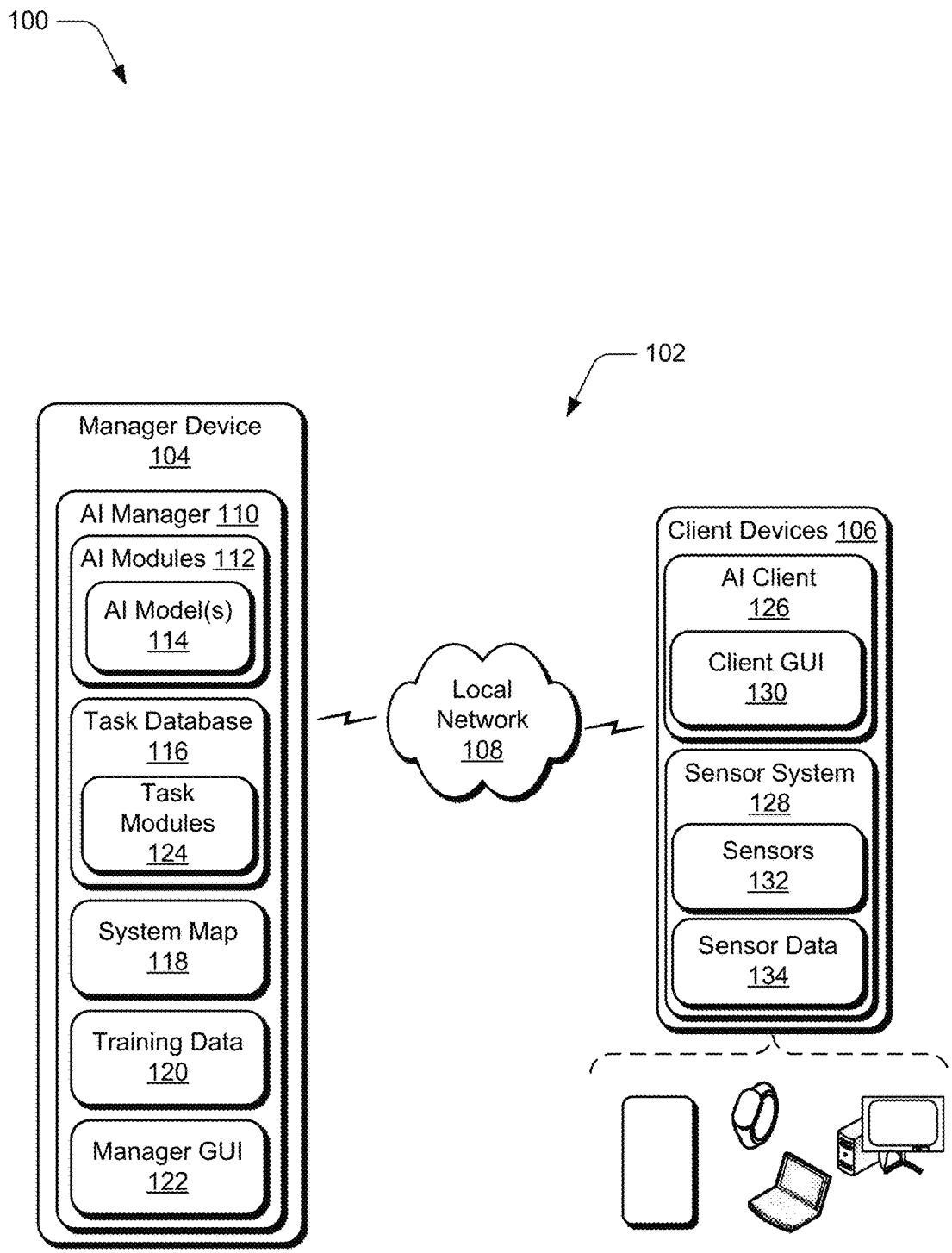
FIG. 1 illustrates an example environment in which aspects of AI modules for computation tasks can be implemented.

Techniques for AI modules for computation tasks are described, and may be implemented to enable multiple AI modules to be aggregated to form an execution structure (e.g., an execution chain) for performing a computation task. Generally, the described techniques aggregate AI modules based on their respective functions to perform an overall computation task.

For instance, in an example implementation, a manager device (e.g., an AI server) and multiple client devices are interconnected within a local computing environment, such as a local area network (LAN). An AI manager executing on the manager device manages a collection of AI modules that are individually executable to perform a respective computation function. At least some of the AI modules are generated using an AI architecture such as a neural network and/or other AI-related algorithm. To enable different computation tasks to be performed, the AI modules can be aggregated into different sets to generate a task module that is executable to perform a respective computation task. In at least some implementations, a computation task includes an AI-implemented task, such as visual object recognition, speech recognition, content generation, AI model training, and so forth. Accordingly, each AI module in task module can perform a different function as part of an overall computation task.

To enable AI modules to be aggregated in sets for generating different task modules, the described techniques expose different graphical user interfaces (GUIs) that provide different user experiences, such as AI module selection, task module configuration, task module training, and so forth. For instance, a user can select a set of AI modules from a GUI, and a task module can be generated based on the set of AI modules. The user can then initiate training of the task module to perform a computation task, such as using training data obtained from the user's system(s). A trained task module can then be utilized to perform different computation tasks. In at least one implementation, various aspects of the described techniques can be implemented within a local network to limit potential exposure of sensitive data to unauthorized entities outside of the local network.

Accordingly, techniques described herein provide flexible ways for aggregating AI modules for performing different computation tasks in a local environment. Further, the described techniques provide for enhanced data security by limiting potential exposure of data related to a computation task. For instance, by utilizing client devices in a local computing environment (e.g., a LAN), potential data exposure outside of the local environment is limited. In at least some implementations, the described techniques enhance device and system performance by utilizing local AI resources, thus avoiding data latency that may result from cloud-based AI services.

While features and concepts of AI modules for computation tasks can be implemented in any number of different devices, systems, environments, and/or configurations, aspects of AI modules for computation tasks are described in the context of the following example devices, systems, and methods.

FIG. 1 illustrates an example environment 100 in which aspects of AI modules for computation tasks can be implemented. The example environment 100 includes a local environment 102 including a manager device 104 and client devices 106 connected via a local network 108. In at least one implementation, the environment 100 represents a local environment (e.g., a local physical and/or logical environment) defined by a limited area such as a physical and/or logical perimeter of a residence, enterprise facility, school, university campus, and so forth. Generally, the manager device 104 and the client devices 106 can each be implemented as a variety of different types and instances of computing devices, such as portable computing devices (e.g., a smartphone, a tablet device, a laptop, a wearable computing device, a smart TV, etc.), a desktop device (e.g., a desktop PC), connected home appliances such as Internet of Things (IoT) devices, and so forth. These examples are not to be construed as limiting, however, and the client devices 106 can be implemented in a variety of different ways and form factors. In at least one implementation, the manager device 104 can be implemented as a server device that can manage various AI-related operations within the environment 100. The manager device 104, for instance, may be connected only to devices within a local network (e.g., a LAN) and not externally to the local network, e.g., not connected to the Internet. This is not intended to be limiting however, and in at least one implementation the manager device 104 may include connectivity outside of a local environment. Further example attributes of the manager device 104 and the client devices 106 are discussed below with reference to the device 1300 of FIG. 13.

The local network 108 represents a network (e.g., a Local Area Network (LAN)) that interconnects devices within a limited area associated with the local environment 102. The manager device 104 and the client devices 106, for instance, connect to the local network 108 via wireless and/or wireless connectivity. Generally, the local network 108 can be implemented using different network protocols and/or topologies. For instance, the local network 108 can be implemented via a connectivity device such as a router that is separate from the client devices 106 and that interconnects the client devices 106. Alternatively or in addition, the local network 108 can be implemented via direct connectivity between the client devices 106, such as part of an ad hoc wireless network and/or mesh network. In at least some implementations, the client devices to participate in different AI-related tasks described herein are to be paired and in proximity to an owner/user, such as located in the user's home, co-located with the user in a portable setting (e.g., while traveling), etc.

In at least some implementations, the local network 108 represents a local authentication environment positioned within the local environment 102. For instance, each of the client devices 106 engage in an authentication procedure to authenticate with the local network 108 to permit data to be exchanged between the client devices 106 over the local network 108. Thus, other devices that are present within the local environment 102 but that are not authenticated with the local network 108 may have limited or no visibility into data communicated across the local network 108 between the manager device 104 and the client devices 106.

The manager device 104 includes various functionality that enables the manager device 104 to perform different aspects of AI modules for computation tasks discussed herein, including an artificial intelligence (AI) manager module ("AI manager") 110, which is representative of functionality to manage and perform different AI tasks. For instance, the AI manager 110 implements different AI modules 112, and at least some of the AI modules 112 include a respective AI model 114 and/or set of AI models 114. Generally, the AI models 114 each represent an algorithm architecture that can be leveraged to process data in various ways further to different AI tasks. Individual AI modules 112 may be implemented using any suitable AI architecture, such as an artificial neural network, a decision tree, a support vector machine, Hidden Markov model, linear regression, logistic regression, Bayesian networks, and so forth. As detailed below, the AI modules 112 can be individually trained to perform specific tasks, and can be arranged in different sets of AI modules to generate different types of output.

The AI manager 110 further includes a task database 116, a system map 118, training data 120, and a manager graphical user interface (GUI) 122. Generally, the task database 116 represents a collection of different computation tasks that the AI manager is capable of performing. Further, the task database 116 identifies different discrete sets of AI modules 112 that are capable of performing specific instances of computation tasks. The AI manager 110, for instance, can train different sets of AI modules to perform different tasks, and identify the sets of AI modules and their corresponding tasks in the task database 116. Further, when a user requests a particular task, the task database 116 can be referenced to identify a set of AI modules 112 to be used to perform the task. Accordingly, the task database 116 identifies different task modules 124 which represent different sets of AI modules 112 that are generated to perform different computation tasks.

In at least some implementations, the task database 116 can link different task modules 124 to specific instances of client devices 106. For instance, different task modules 124 may be executable to perform computing tasks that utilize input and/or provide output that is directed to specific instances of client devices 106. Thus, a functional mapping may be generated between instances of task modules 124 and respective instances of client devices 106.

The system map 118 represents a mapping of different devices in the local environment 102, such as devices that are currently and/or historically connected to the local network 108. The system map 118, for instance, identifies each of the individual client devices 106 and attributes of the client devices 106. For example, for each client device 106, the system map 118 can include device attributes such as device identifier, device type (e.g., mobile phone, desktop, tablet, etc.), device hardware (e.g., processor type, display type, available sensors, etc.), device capabilities (e.g., processor bandwidth, memory bandwidth, data storage capabilities, sensor capabilities, etc.), device power state (e.g., plugged-in state, battery charge level, etc.), network speed (e.g., wireless and/or wired network connectivity bandwidth), and so forth. In at least some implementations, the system map 118 is dynamically and/or continuously updated to keep a real-time representation of devices that are active and/or inactive in the local environment 102.

The training data 120 represents data that can be used to train the AI modules 112 and the task modules 124 to perform different AI-related tasks. In at least one implementation, the training data 120 can be generated locally within the local network 108 and/or by the client devices 106. For instance, users authenticated to the manager device 104 can provide the training data to enable the AI modules 112 and the task modules 124 to be trained to perform personalized computation tasks for the users. The manager GUI 122 provides an interface that enables user interaction with the AI manager 110, such as for configuring the AI modules 112, generating task modules 124, requesting different computation tasks, and so forth.

The client devices 106 each include various functionality that enables the client devices 106 to participate in different aspects of AI modules for computation tasks discussed herein, including an artificial intelligence (AI) client 126 and a sensor system 128. Generally, the AI client 126 represents functionality to enable interaction between the client devices 106 and the manager device 104. The AI client 126, for instance, includes a client GUI 130 via which a user can configure and access functionality of the AI client 126 and/or the AI manager 110. A user, for instance, may interact with the AI manager 110 via the manager GUI 122 and/or the client GUI 130.

The sensor system 128 is representative of functionality to detect various physical and/or logical phenomena in relation to the client device 106, such as motion, light, image detection and recognition, time and date, position, location, touch detection, temperature, and so forth. To enable the sensor system 128 to detect such phenomena, the sensor system 128 includes sensors 132 that are configured to generate sensor data 134. Examples of the sensors 132 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In at least some implementations, the sensor data 134 represents raw sensor data collected by the sensors 132. Alternatively or in addition, the sensor data 134 represents raw sensor data from the sensors 132 that is processed to generate processed sensor data, such as sensor data from multiple sensors 132 that is combined to provide more complex representations of client device 106 state than can be provided by a single sensor 132. Generally, the sensor system 128 implemented on the individual client devices 106 may include duplicate or different functionality (e.g., different sensors 132). For instance, individual client devices 106 may include different instances of sensors such that each client device 106 is enabled to collect a unique set of sensor data 134.

Having discussed an example environment via which aspects of AI modules for computation tasks may be implemented, consider now some example implementation scenarios for implementing aspects of AI modules for computation tasks.

Figure 2:
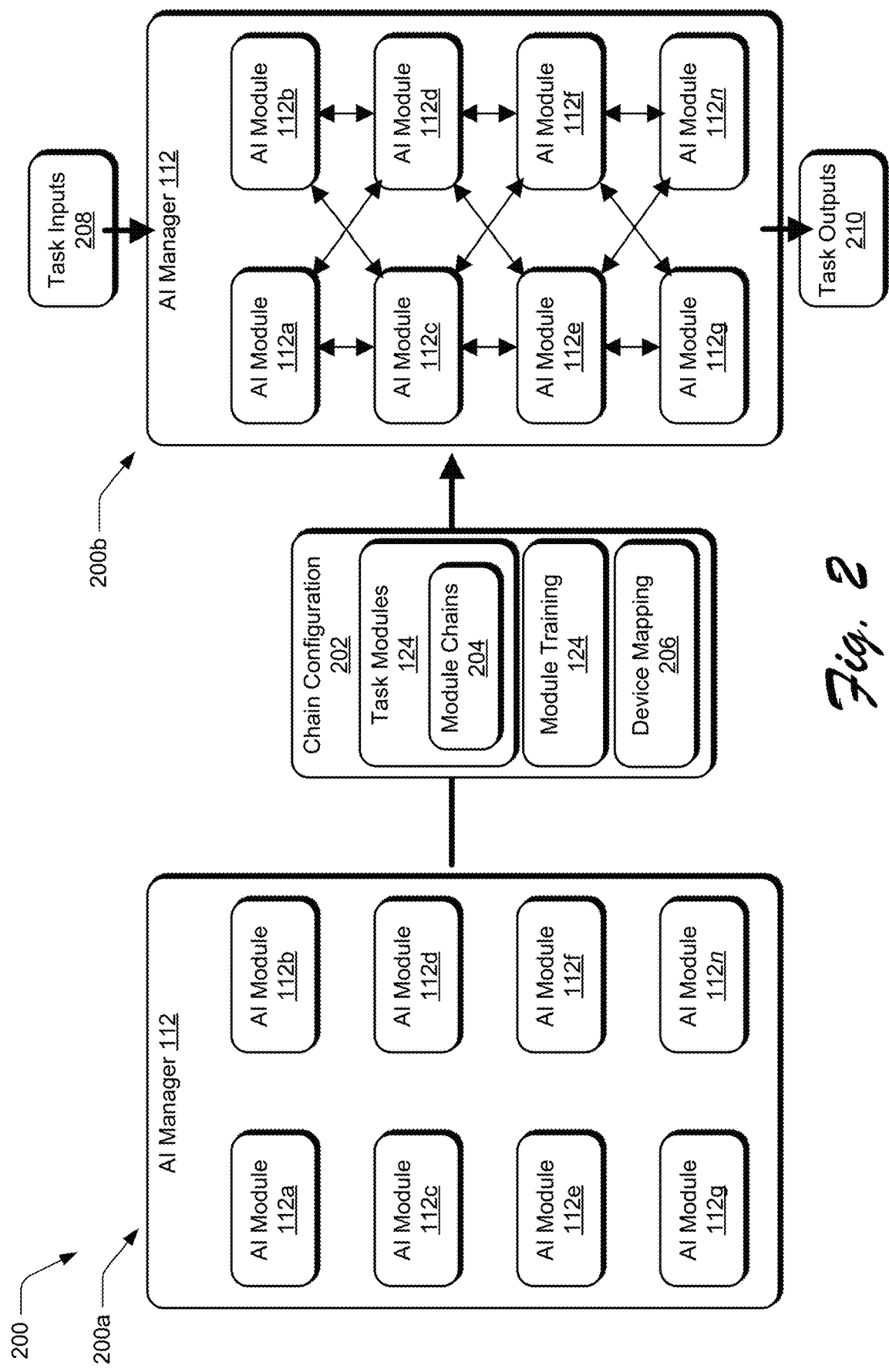
FIG. 2 depicts an example scenario for configuring different modules chains including different AI modules according to techniques for AI modules for computation tasks in accordance with one or more implementations.

FIG. 2 depicts an example scenario 200 for configuring different modules chains including different AI modules according to techniques for AI modules for computation tasks. At segment 200a of the scenario 200, the AI manager 110 includes different AI modules 112a-112n that are available to generate different module chains. The segment 200a, for instance, represents an initial configuration of the AI manager 110. For example, a user purchases the manager device 104 with the AI manager 110 installed, and/or installs the AI manager 110 on the manager device 104. Further, the AI modules 112a-112n may be selected and installed, and in at least one implementation, the AI modules may be individually purchased and/or purchased as a set. Generally, at the segment 200a, at least some of the AI modules 112 have individual functionality but are not interconnected. For instance, at least some of the AI modules 112 implement different AI architectures (e.g., different AI models 114) to provide for a diversity of AI processing capabilities.

Accordingly, at segment 200b, the AI manager 110 implements a chain configuration 202 to interconnect different instances of the AI modules 112 and generate different task modules 124 based on module chains 204. The chain configuration 202 can occur in different ways, such as by manual module interconnection by user interaction with the AI manager 112, such as via the AI client 126. Alternatively or in addition, the AI manager 110 can automatically configure the module chains 204, such as to perform different types of computation tasks. As yet another implementation, the module chains 204 can be dynamically configured, such as in response to an instruction to perform a particular task. The task modules 124 and their respective module chains 204 can be listed in the task database 116, such by identifying sets of AI modules 112 in each task module 124, an order of AI modules 112 in each module chain 204, types of tasks that can be performed by each task module 124, and so forth.

In at least some implementations, the chain configuration 202 includes device mapping 206 which creates mappings between different instances of client devices 106 and respective task modules 124. For instance, different instances of the client devices 106 may be configured to provide different types of input data and/or to utilize different types of output data, and thus functional connections can be created between instances of task modules 124 and instances of client devices 106. For instance, consider a scenario where a particular client device 106 includes a camera that captures images from an entrance of a facility. Accordingly, the camera may be able to provide input data for visual object recognition by a particular task module 124. Thus, the device mapping 206 can map the camera to the particular task module 124 to enable the task module 124 to be activated for performing visual object recognition for the camera. The device mapping 206, for instance, can map a task module 124 to a particular client device 106 based on functional capabilities of the client device and input/output of the task module 124.

Accordingly, the AI manager 110 can take different task inputs 208 and utilize the task modules 124 to generate task outputs 210 based on the task inputs 208. Each task module 124, for instance, can be associated with a different computation task, and can be leveraged to generate specific types of task output 210 based on specific task input 208.

Figure 3:
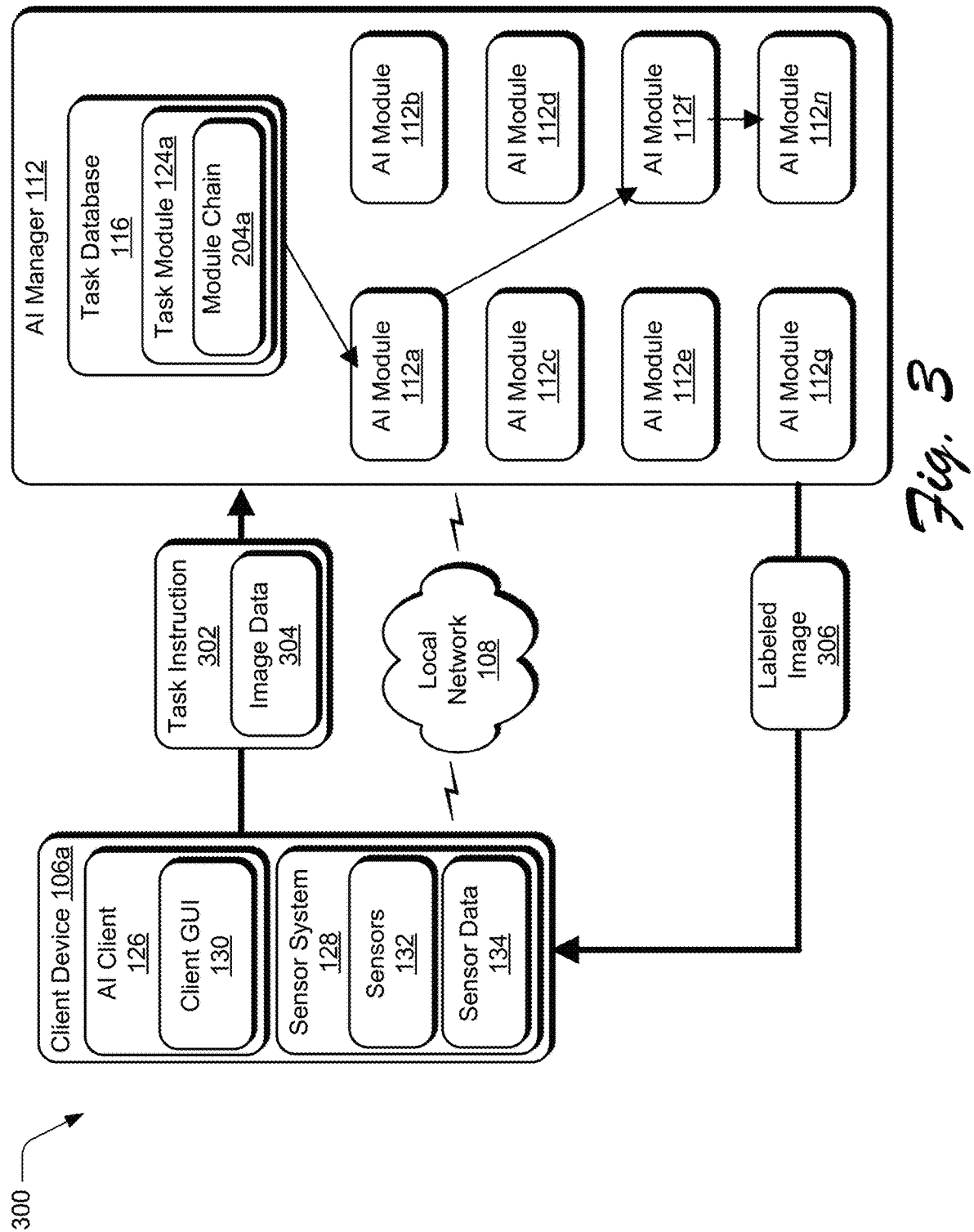
FIG. 3 depicts a scenario for performing an AI task utilizing a chain of AI modules in accordance with one or more implementations.

FIG. 3 depicts a scenario 300 for performing an AI task utilizing a chain of AI modules. In the scenario 300, a client device 106a causes a task instruction 302 to be submitted to the AI manager 110. The task instruction 302, for instance, instructs the AI manager 110 to perform a particular task. In this particular example, the task instruction 302 includes image data 304 and a request to perform object recognition of a visual object within the image data 304. In at least one implementation, the image data 304 includes a digital image and/or set of digital images captured by the client device 106a, such as via a camera managed by the sensor system 128. For instance, the client device 106a may include security functionality for monitoring security of a particular location, such as a home, an enterprise facility, a government facility, and so forth. Thus, the client device 106a can request recognition of a visual object included in the image data 304, such as for identifying a person captured in the image data 304.

Accordingly, the AI manager 110 inspects the task database 116 to identify a task module 124a that includes a module chain 204a that is capable of performing the task identified in the task instruction 302, e.g., object recognition using the image data 304. As mentioned above, the task database 116 identifies different task modules 124 with different respective sets of AI modules 112 that are capable of performing different tasks.

In this particular example, the module chain 204a includes AI modules 112a, 112f, and 112n. Generally, these different AI modules can each perform different functions as part of the task instruction 302. In one example implementation, for instance, the AI module 112a represents an image normalization module that performs image normalization on the image data 304; the AI module 112f represents a feature extraction module that identifies and extracts different visual objects from the normalized image data; and the AI module 112n represents an object recognition module that generates predicted labels for visual objects extracted from the image data 304. Accordingly, each of the AI modules of the task module 124a performs its respective functionality to process the image data 304, and the AI manager 112 outputs a labeled image 306. Generally, the labeled image 306 identifies a visual object and/or set of visual objects identified and labeled from the input data 304. For instance, the image data 304 may include an image of a human face, and the labeled image 306 may include an identifier for the human face, such as the identity of a person.

Further to the scenario 300, the labeled image 306 is communicated from the AI manager 110 to the client device 106a, e.g., across the local network 108. The AI client 126 at the client device 106a may utilize the labeled image 306 for various purposes, such as for identifying a person as part of a facilities security procedure.

Figure 4:
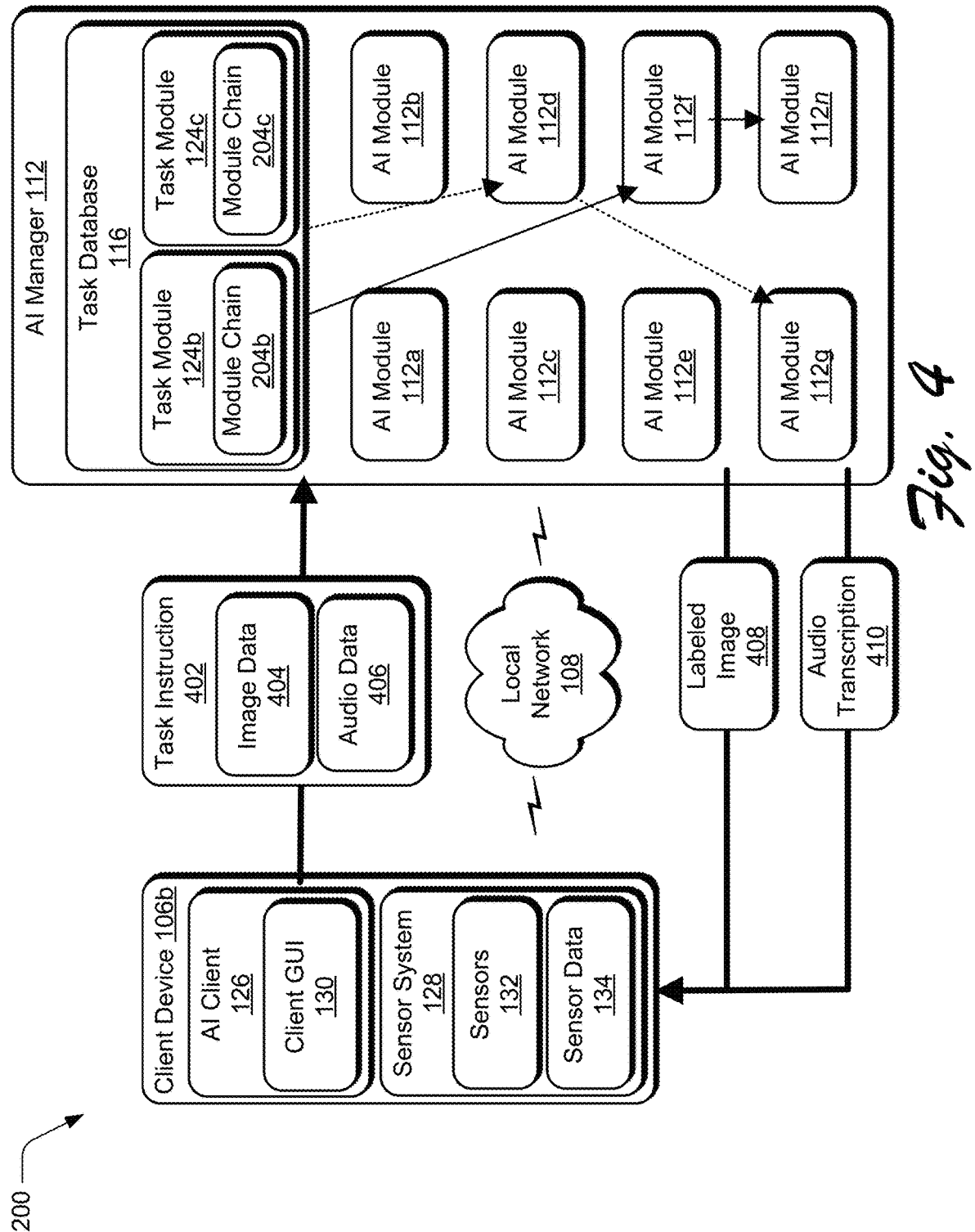
FIG. 4 depicts a scenario for performing multiple computation tasks utilizing different chains of AI modules in accordance with one or more implementations described herein.

FIG. 4 depicts a scenario 400 for performing multiple computation tasks utilizing different chains of AI modules. In the scenario 400, a client device 106b submits a task instruction 402 to the AI manager . In this example, the task instruction 402 includes image data 404 and audio data 406, and a request to recognize visual objects in the image data 404 and to generate text recognized from the audio data 406. The task instruction 402 also indicates that the image data 404 is a high quality image. Thus, image normalization may not be required to accurately recognize visual objects in the image data 404.

Accordingly, the AI manager 110 inspects the task database 116 to identify a task modules that are capable of performing the tasks identified in the task instruction 402, e.g., object recognition using the image data 404 and text recognition using the audio data 406. Based on the indication that the image data 404 includes a high quality image, the AI manager 110 identifies a task module 124b based on a module chain 204b that includes the AI module 112f (e.g., for feature extraction), and the AI module 112n (e.g., for object recognition), but does not include the AI module 112a for image normalization.

Further, the AI manager 110 identifies task module 124c based on a module chain 204c that is capable of processing the audio data 406 and recognizing speech within the audio data 406 to generate a text transcription of the speech. In this example, the module chain 124c includes an AI module 112d and an AI module 112g. The AI module 112d, for instance, represents a noise reduction function that can process the audio data 406 to remove excess noise and generate filtered audio data that is more conducive to accurate speech recognition. Further, the AI module 112g represents a speech recognition module, such as based on a Hidden Markov Model that can process the filtered audio data, recognize words within the filtered audio, and output a text transcript of the recognized words.

Accordingly, the AI manager 110 processes the image data 404 using the task module 124b to generate a labeled image 408, and processes the audio data 406 using the task module 124c to generate an audio transcription 410. In at least one implementation, the processing by the respective task modules 124b, 124c can occur simultaneously and/or concurrently. The labeled image 408 and the audio transcription 410 can then communicated to a particular device, such as to the requesting client device 106b.

Thus, the scenario 400 demonstrates that techniques for AI modules for computation tasks can be employed to identify multiple different AI module chains that can be leveraged to process input data to generate different forms and/or types of output. For instance, input data may include different types of data (in this case, images and audio), and thus different AI module chains can be selected based on their ability to process the different data types. Generally, the specific instances of AI modules 112 discussed above are presented for purpose of example only, and it is to be appreciated that the described and claimed AI modules may utilize a variety of different functions and algorithms.

FIG. 5-8 depict different GUIs that can be utilized to implement different aspects of AI modules for computation tasks. The described GUIs, for instance, can be implemented using the manager GUI 122 and/or the client GUI 130.

Figure 5:
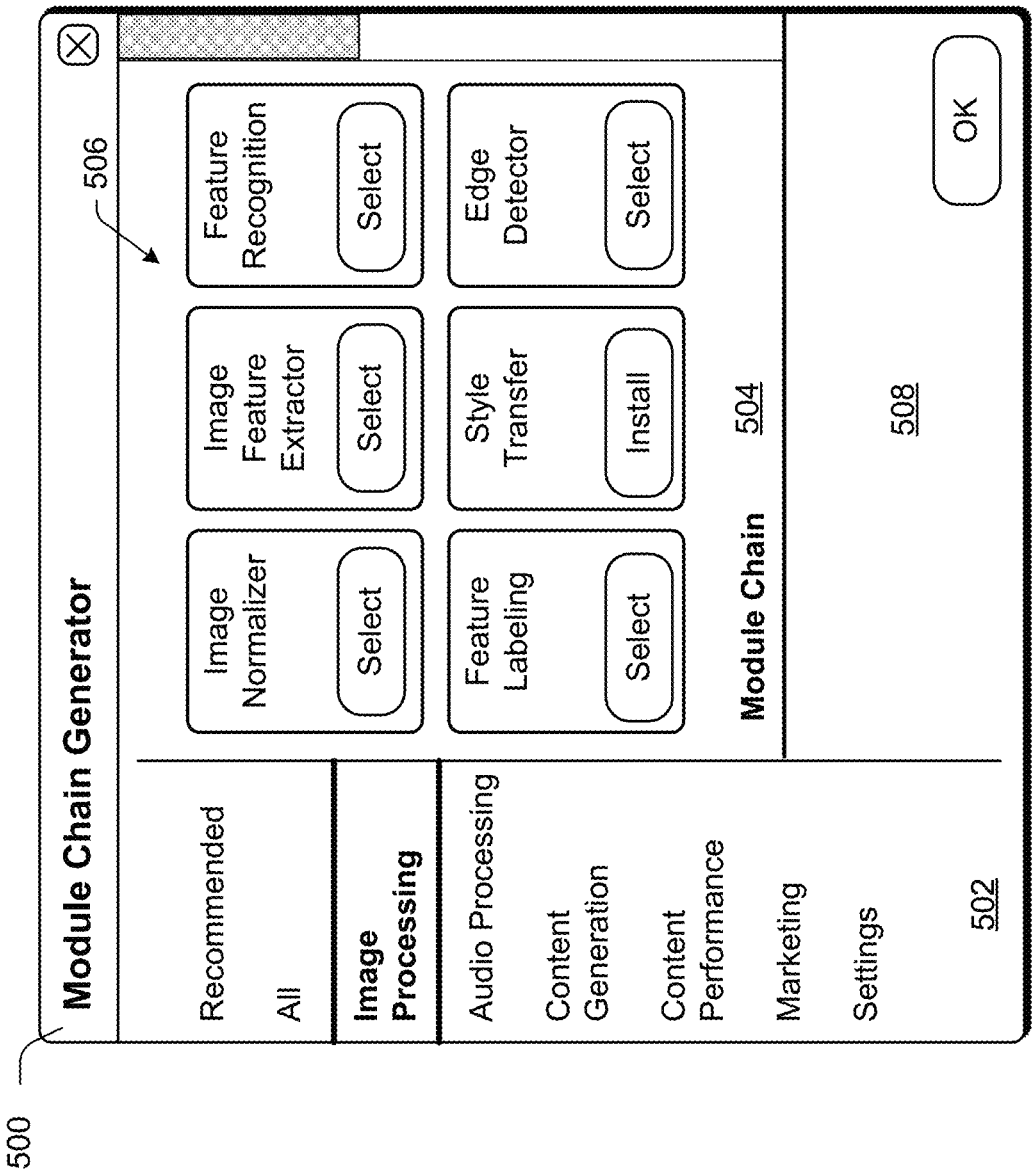
FIG. 5 depicts a GUI for configuring different aspects of AI modules for computation tasks in accordance with one or more implementations described herein.

FIG. 5 depicts a GUI 500 for configuring different aspects of AI modules for computation tasks. The GUI 500 includes a module category region 502 and a module explorer region 504. Generally, the module category region 502 displays different categories of AI modules 112 that are available for generate module chains to perform different AI tasks. Further, the module explorer region 504 displays indicia 506 (e.g., icons) that represent different instances of AI modules 112 that are available to generate module chains, such as based on a category of AI modules selected from the module category region 502.

For instance, a "Recommended" category is selectable to populate the module explorer region 504 with indicia 506 identifying recommended AI modules 112. Recommended AI modules, for instance, may be based on different criteria, such as AI modules that are popular across a large user population (e.g., crowdsourced), AI modules that pertain to computing tasks commonly performed by a specific user, AI modules that are similar to other AI modules previously implemented by a specific user, and so forth. In at least one implementation, the "Recommended" category includes recommended module chains (e.g., sets of AI modules) for performing specific types of tasks, such as image processing, audio processing, and so forth.

Further, the "Image Processing" category is selectable to populate the module explorer region 504 with indicia 506 identifying AI modules 112 that pertain to different types of digital image processing. Accordingly, the different categories identified in the module category region are selectable to populate the module explorer region 504 with indicia of AI modules that pertain to a respective selected category.

In this particular example, the "Image Processing" category is selected, and thus the module explorer region 504 is populated with indicia 506 representing AI modules 112 that can perform different functions pertaining to image processing. As illustrated, some of the indicia 506 include a "Select" control that is selectable to select a respective AI module for use in performing a task, such as different AI tasks according to techniques for AI modules for computation tasks. For instance, selecting a particular indicia 506 causes a respective AI module 112 to be added to a module chain identified in a module chain field 508.

Also illustrated is that a Style Transfer indicia 506 includes an "Install" control that is selectable to cause respective style transfer AI module to be installed. Generally, this indicates that this particular AI module is not currently installed and/or active on the AI manager 110. In at least one implementation, selecting the Install control causes a navigation to an installation experience that enables the particular AI module to be purchased and/or installed.

Figure 6:
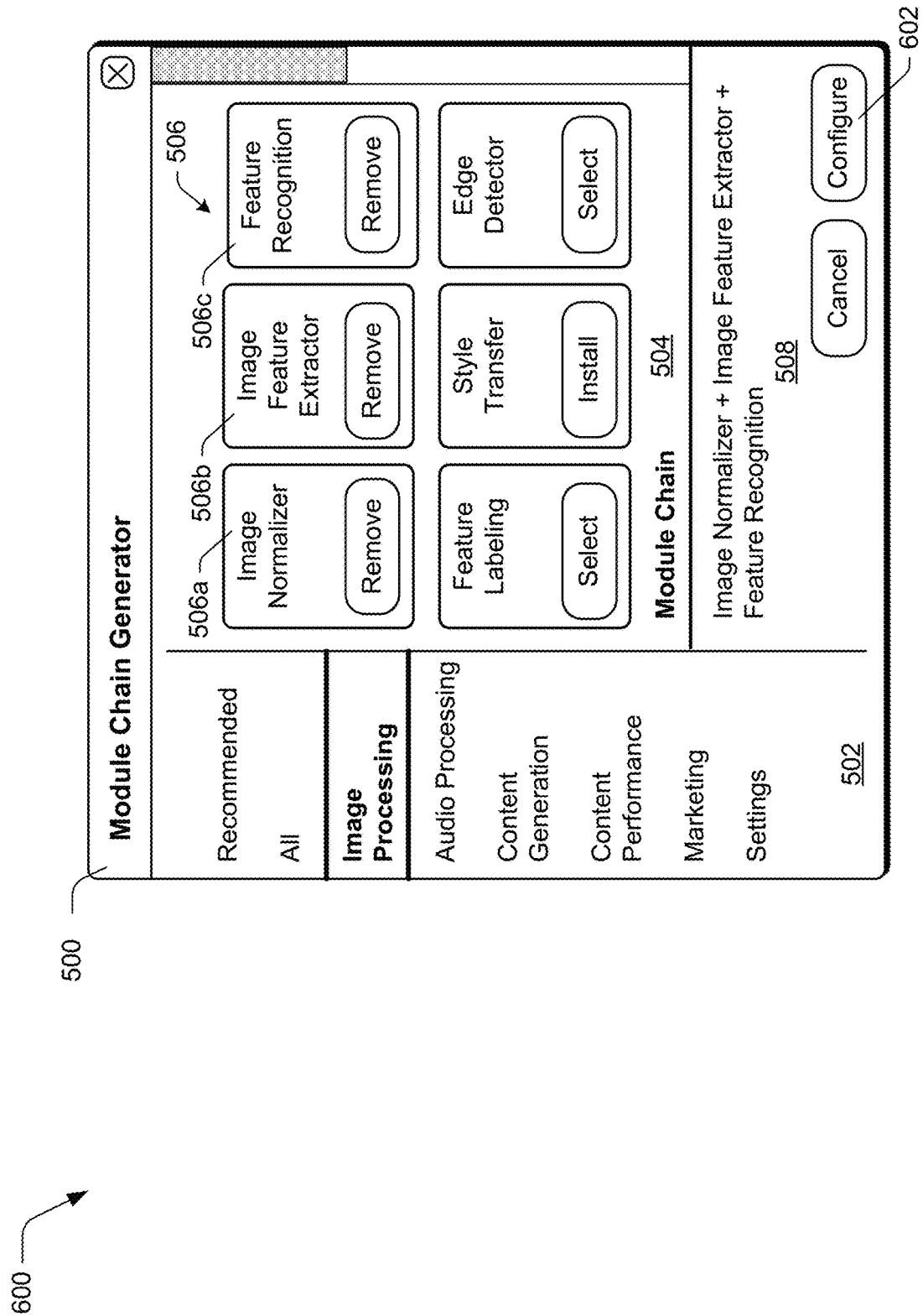
FIG. 6 depicts a scenario for configuring an AI module chain in accordance with one or more implementations described herein.

FIG. 6 depicts a scenario 600 for configuring an AI module chain. In the scenario 600, a set of indicia 506 have been selected via the GUI 500, including indicia 506a, 506b, 506c. For instance, a user selects the "Select" control on the indicia 506a-506c. Alternatively or in addition, a user can select and drag respective indicia 506a-506c from the module explorer region 504 to the module chain field 508, such as via touch input, mouse and cursor input, and so forth. Accordingly, the selected indicia are identified in the module chain field 508, such as in an order in which the indicia 506a-506c are selected. Notice also that after selection of the "Select" controls, the "Select" controls are replaced with "Remove" controls. Generally, the "Remove" controls are selectable to remove a respective AI module from the module chain region 508. Further to the scenario 600, a user selects a configure control 602, which causes a transition to a module chain configuration experience, discussed below.

Figure 7:
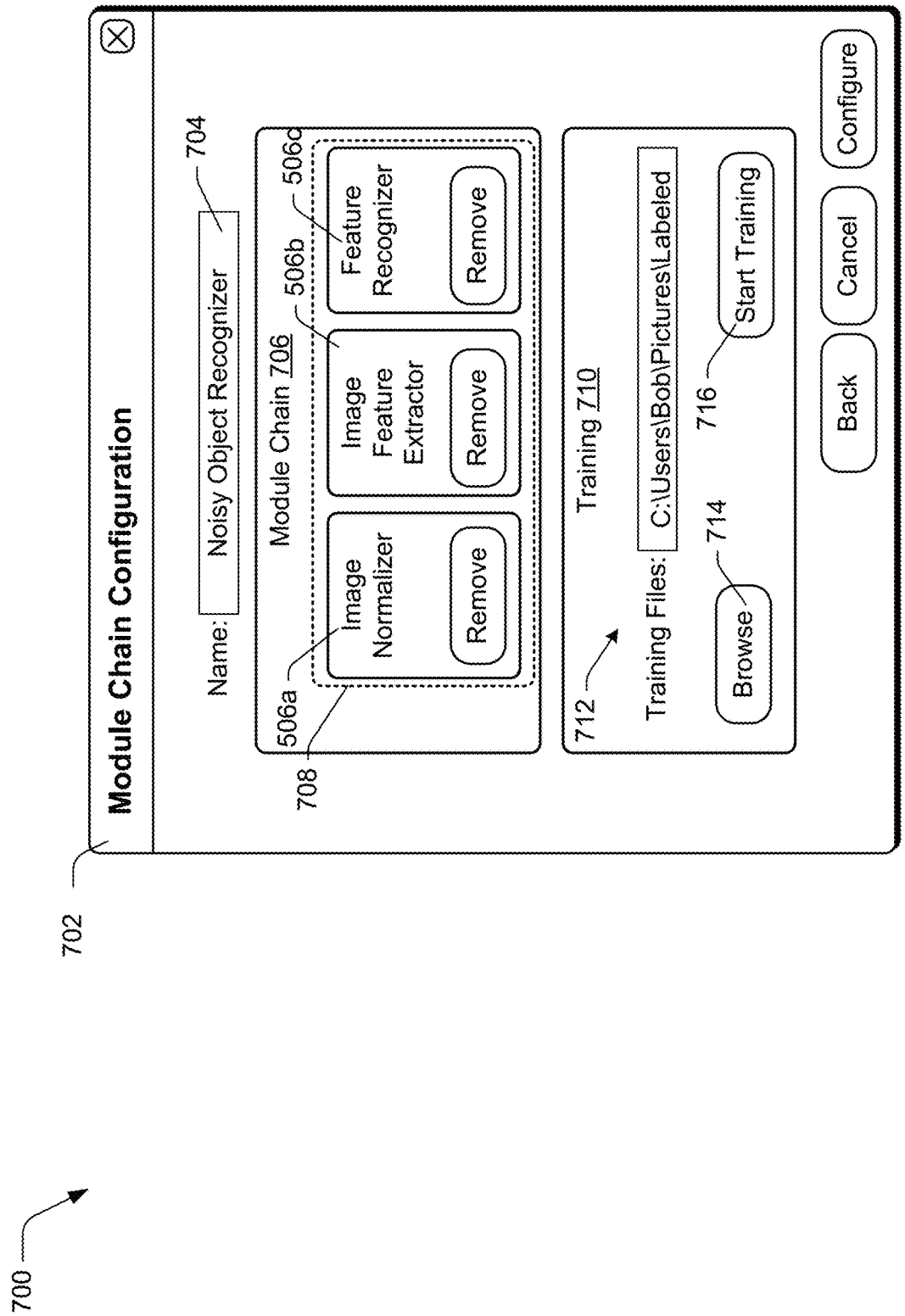
FIG. 7 depicts a scenario for configuring an AI module chain in accordance with one or more implementations described herein.

FIG. 7 depicts a scenario 700 for configuring an AI module chain. The scenario 700, for instance, represents a continuation of the scenarios 500, 600, above. For example, the scenario 700 is presented by the AI manager 110 in response to selection of the configure control 602 from the GUI 500. The scenario 700 includes a GUI 702 that enables various attributes of a task module to be configured. The GUI 702 includes a name field 704 and a module chain region 706. The name field 704 includes a name for a task module, such as based on user input specifying a name. A name indicated in the name field 706, for instance, can be used to identify the task module in the task database 116. The module chain region 706 includes a set of indicia 506 that identify AI modules 112 of a module chain 708 selected for generating a task module. The module chain 708, for instance, includes the indicia 506a-506c selected as described in the scenario 600.

In at least one implementation, the indicia 506a-506c are presented as part of the module chain 708 in an order (left to right) in which they were selected from the GUI 600, e.g., first selected to last selected. Alternatively or in addition, the indicia 506a-506c are presented in a functional order based on functionality of respective AI modules 112 represented by the indicia. The AI manager 110, for instance, can order the indicia 506a-506c to indicate a suggested order for the module chain 708. For example, the suggested order can be based on functionality of AI modules 112 represented by the indicia 506a-506c, such as inputs and outputs of the AI modules, such as to optimize output of the module chain 708. In this particular example, the Image Normalizer can process (e.g., normalize) an input image to provide a normalized image that the Image Feature Extractor can more accurately process to extract features than an original, non-normalized input image. Further, the Feature Recognizer can more accurately recognize visual features that are first extracted by the Image Feature Extractor. Thus, the order of AI modules 112 identified as part of the module chain 708 can represent a functional processing order of AI modules included in the module chain.

In at least one implementation, the order of AI modules 112 in the module chain 708 can be manually specified, such as via user input. A user, for instance, can rearrange the order of AI modules, such as by dragging and dropping instances of the indicia 506 at different positions within the module chain 708. This can enable a functional order of the module chain 708 to be customized. Further, a user can select a "Remove" control from the different indicia 506 to cause a respective AI module 112 to be removed from the module chain 708.

The GUI 702 further includes a training region 710 that enables training data for training the module chain 708 to be selected. For instance, a files field 712 identifies training data files to be used for training the module train 708. In at least one implementation, files identified in the files field 712 include labeled training data, such as for performing supervised training of the module chain 708. A browse control 714 is selectable to present a file browsing experience for locating and selecting training files, and a start control 716 is selectable to initiate the training process.

Figure 8:
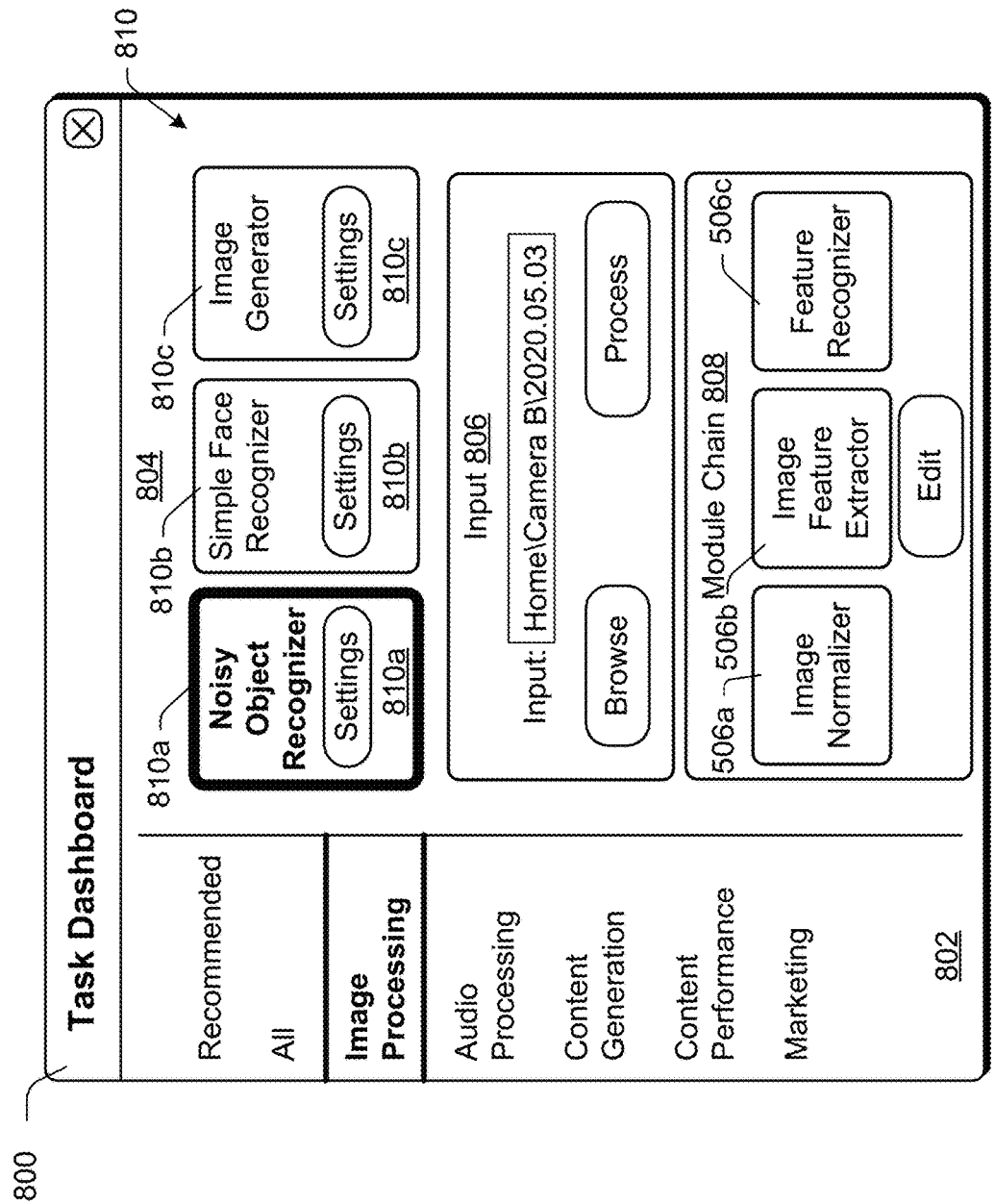
FIG. 8 depicts a GUI which can be implemented to perform different tasks using task modules in accordance with one or more implementations described herein.

FIG. 8 depicts a GUI 800 which can be implemented to perform different tasks using task modules, such as task modules generated using the scenarios/GUIs presented above. The GUI 800 includes a task category region 802, a task modules region 804, an input region 806, and a module chain region 808. The task category region 802 identifies different categories of tasks that are available to be performed. The task category region 802, for instance, includes categories of task modules 124 from the task database 116. The task modules region 804 includes indicia 810 that identify different instances of task modules 124 that are available to perform specific tasks. Generally, the task modules region 804 is populated with indicia 810 that identify task modules 124 that are available to perform tasks within a task category selected from the task category region 802.

In this particular example, an "Image Processing" task category is selected from the task category region 802, and thus the task modules region 804 includes indicia 810a-810c identifying respective task modules 124 that are available to perform image processing. For instance, each of the indicia 810a-810c is selectable to enable utilization of a respective task module 124 for performing a computation task. As illustrated, the indicia 810a which represents the "Noisy Object Recognizer" task module 124 is selected.

Generally, the input region 806 enables a source of input data to be identified for processing by a selected task module 124. A variety of different sources can be specified via the input region 806, such as data files, specific devices, sensor data feeds, and so forth. For instance, in at least one implementation, output from a particular sensor 132 on an instance of a client device 106 can be utilized to obtain input data, such as a camera, a microphone, and so forth. The input region 806 also includes a "Process" control that is selectable to initiate processing of input data utilizing the selected task module 124. For instance, selecting the Process control causes input data identified in the input region 806 to be obtained and processed using a selected task module, which then provides some form of output. Example architectures for such input/output scenarios are presented above in the scenarios 300, 400.

The module chain region 808 is configured to display a set of AI modules 112 that make up a task module selected from the task modules region 804. In this particular example, the module chain region 808 displays the indicia 506a-506c of selected AI modules 112, such as described in the previous scenarios. The module chain region 808 also includes an "Edit" control that is selectable to enable editing of the depicted module chain. For instance, selecting the Edit control causes the GUI 500 to be presented as depicted in FIG. 6, which enables AI modules to be added and/or removed from the module chain.

Figure 9:
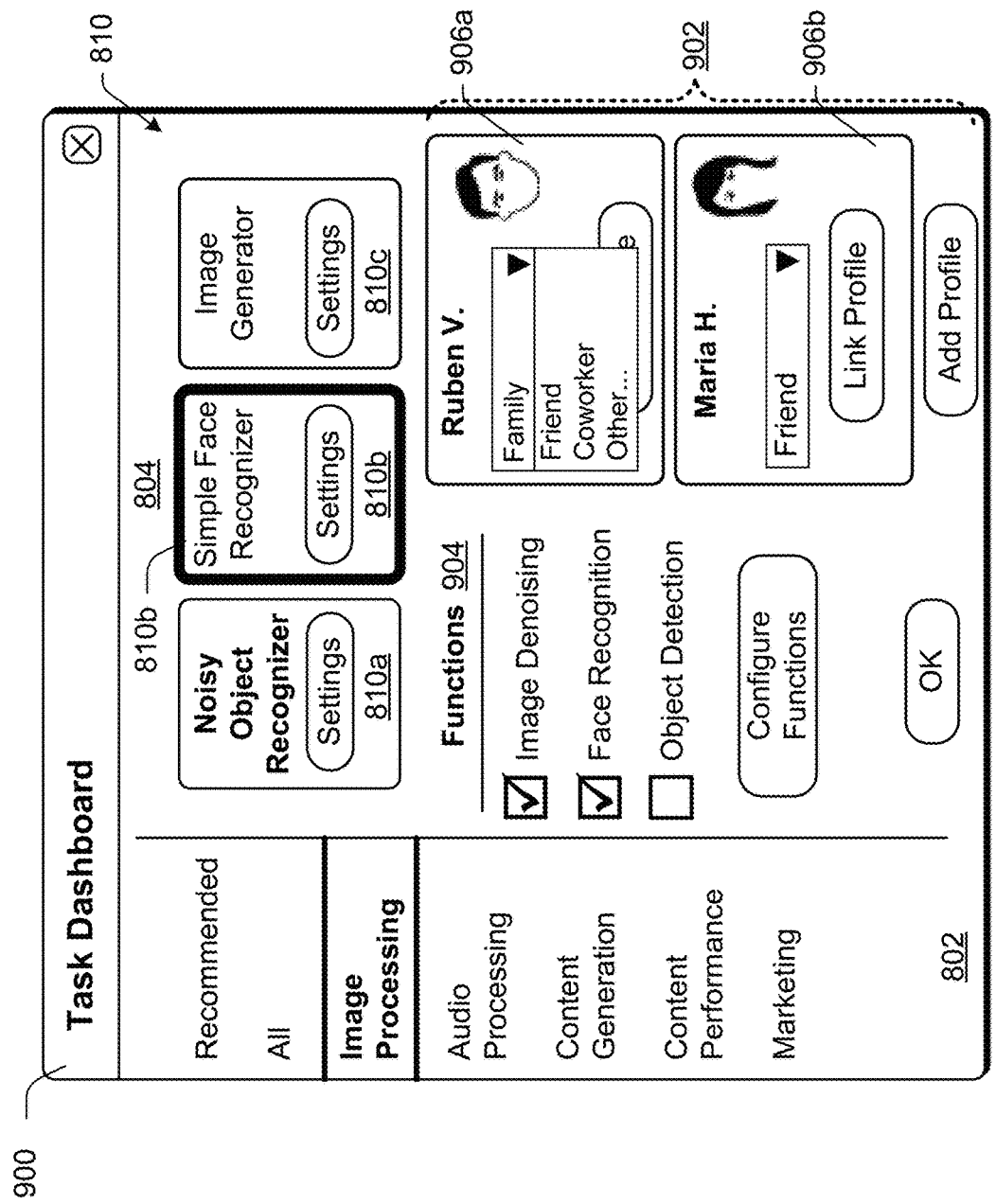
FIG. 9 depicts a GUI which can be implemented to configure various operation of different AI module chains and/or task modules in accordance with one or more implementations described herein.

FIG. 9 depicts a GUI 900 which can be implemented to configure various operation of different AI module chains and/or task modules, such as module chains and/or task modules generated using the scenarios/GUIs presented above. The GUI 900 includes the task category region 802, the task modules region 804, a profiles region 902, and a functions region 904. Example attributes of the task category region 802 and the task modules region 804 are discussed above. In this particular example, the indicia 810b for a "Simple Face Recognizer" task module 124 is selected from the task modules region 804. Accordingly, the profiles region 902 includes profiles for different persons that can be recognized via functionality of the Simple Face Recognizer. A user, for instance, configures the Simple Face Recognizer to recognize faces of specific persons, such as using the task module training techniques described herein. Thus, different persons that are recognizable via the Simple Face Recognizer are identified in the profiles region 902, which includes recognition profiles 906a, 906b.

The recognition profiles 906 are visually representations of underlying data collections (e.g., as stored by the AI manager 110) and each include a person's name and an image of the person's face that is recognizable via the Simple Face Recognizer. Further, the recognition profiles 906 includes a relationship menu and a link profile control. Generally, the relationship menu is selectable to indicate a relationship of a respective person to a user, such as a user configuring the recognition profiles. In this particular example, the relationship menu includes relationship options of "Family," "Friend," "Coworker," and an "Other" category that is selectable to specify a relationship type not depicted in this example. In at least one implementation, specifying a relationship for a recognition profile enables recognition events to be categorized and tracked, as well as recognition alerts to be configured.

The "Link Profile" control in the recognition profiles 906 enable the recognition profiles 906 to be linked to sources of information about respective users, such as social media profiles. For instance, selecting a Link Profile control causes a profile link menu to be presented, which enables a user to identify a social media page for a respective person on a particular social media platform. Generally, this enables various information about the person to be obtained to assist in building a personal profile, such as photos, personal preferences, common social media contacts, and so forth. In at least one implementation, a linked social media profile can be used to identify relationship information for a respective recognition profile 906. For instance, a social media profile may identify a relationship of a person to a user, such as whether they are family, friends, members of a particular group, and so forth. The profiles region 902 also includes an add profile control, which is selectable to enable additional recognition profiles 906 to be added.

The functions region 904 enables different functions of a task module to be enabled, disabled, added, or deleted. In this particular example, the functions region 904 lists different available functions for the Simple Face Recognizer, including image denoising, face recognition, and object recognition. Further, the image denoising and face recognition functions are selected and are thus enabled as part of executing the Simple Face Recognizer. However, the object detection function is not selected, and is thus disabled such that general object detection is not performed as part of the Simple Face Recognizer, e.g., detection of visual objects other than faces. In at least one implementation, this simplifies execution of the Simple Face Recognizer to increase execution time and reduce burden on system resources such as processing and memory resources. A "Configure Functions" control is also included, which is selectable to enable different functions of the Simple Face Recognizer to be added or removed from the functions region 904. An "OK" control within the GUI 900 is selectable to cause various parameters specified within the GUI 900 to be applied, such as to configure operation of the Simple Face Recognizer.

These example GUIs and scenarios are presented for purpose of example only, and it is to be appreciated that techniques for AI modules for computation tasks can be employed utilizing a variety of different GUI configurations.

Figure 10:
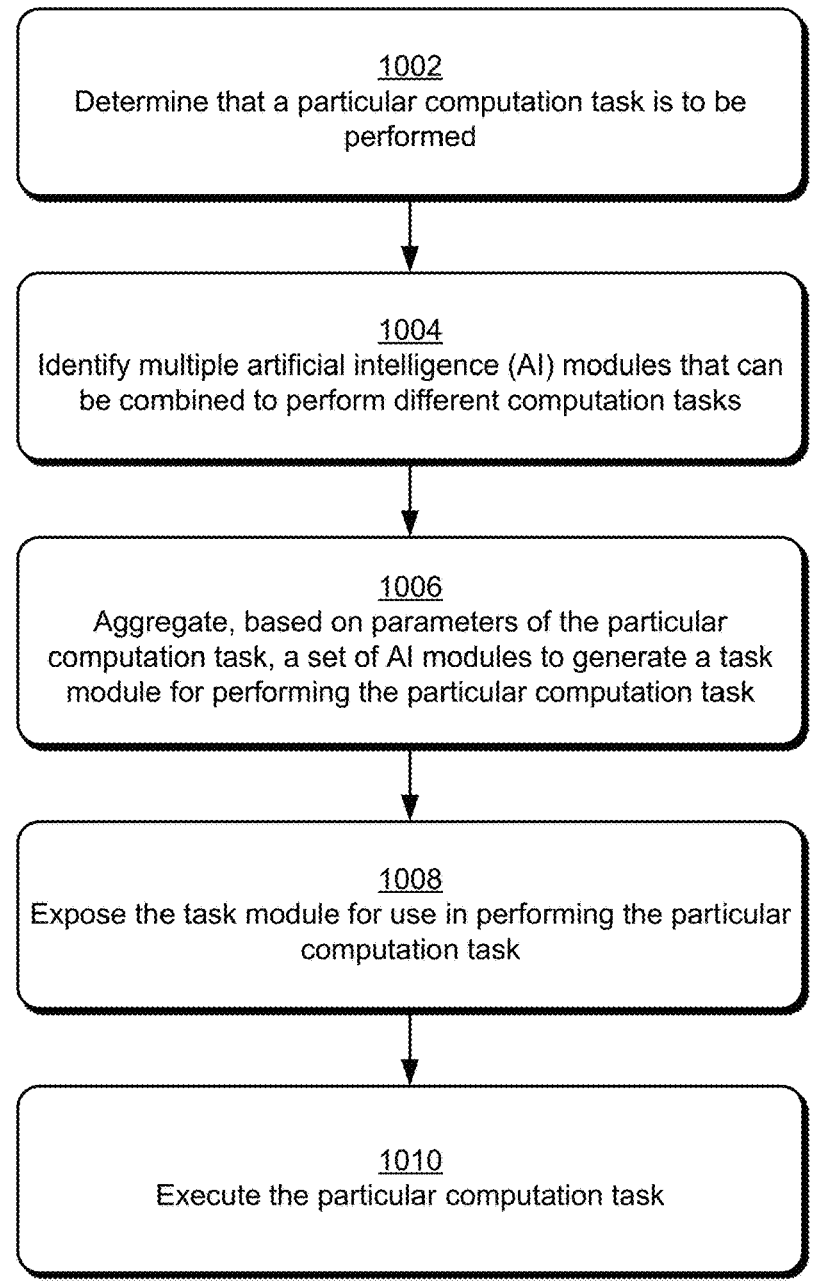
FIG. 10 depicts a method for performing aspects of AI modules for computation tasks in accordance with one or more implementations described herein.

FIG. 10 depicts a method 1000 for performing aspects of AI modules for computation tasks. At 1002, it is determined that a particular computation task is to be performed. A user, for instance, provides input identifying a specific computation task and/or category of computation task to be performed. Alternatively or in addition, the AI manager 110 identifies specific types/instances of computation tasks to be performed. Examples of different computation tasks are described above, and include tasks such as visual object recognition (e.g., face recognition), speech recognition, content generation, and so forth. In an image recognition scenario, for example, the computation task can include digital content and a request to recognize (e.g., classify) visual objects in the digital content. In a speech recognition scenario, the computation task can include audio content and a request to recognize words in the speech content, such as to generate a text transcript from the audio content. In a natural language processing scenario, the computation task can include a request to generate portions of text content that conform to a particular set of language rules, such as a particular language grammar.

At 1004, multiple artificial intelligence (AI) modules are identified that can be combined to perform different computation tasks. Each AI module, for instance, is configured to perform a different function pertaining to different computation tasks.

At 1006, based on parameters of the particular computation task, a set of AI modules from the multiple AI modules is aggregated to generate a task module for performing the particular computation task. For example, the AI manager 110 inspects the AI modules 112 to identify AI modules that are configured to perform different functions pertaining to the particular computation task. Generally, parameters of the computation task include data types to be processed (e.g., digital images, video, audio, etc.), data quality (e.g., high resolution, low resolution, etc.), a type of output requested (e.g., a labeled visual object, speech-to-text transcription, generated content, etc.), and so forth. In at least some implementations, generating the task module includes specifying an execution chain (e.g., order of execution) for the individual AI modules of the set of AI modules.

At 1008, the task module is exposed for use in performing the particular computation task. The AI manager 110, for instance, makes the task module available for performing different computation tasks, such as for providing different types of data processing for the client devices 106. In at least one implementation, a visual indicia of the task module can be displayed, such as via the GUIs discussed above.

At 1010, the particular computation task is executed using the task module. The AI manager 110, for instance, receives data to be input to the task module and executes the different AI modules of the task module using the input data. In at least one implementation, the AI modules are executed in a specific execution order, such as to generate different intermediate processed data and output data from the task module. The output data can be provided to various entities, such as a client device 106.

In at least one implementation, a task instruction can include multiple computation tasks (e.g., visual object recognition accompanied by speech recognition), and thus the method described above can be implemented to generate multiple task modules that each use a specific set of AI modules. Further, the multiple task modules can be executed in conjunction with one another (e.g., concurrently, serially, contemporaneously, etc.) to generate different respective outputs for different respective computation tasks.

Figure 11:
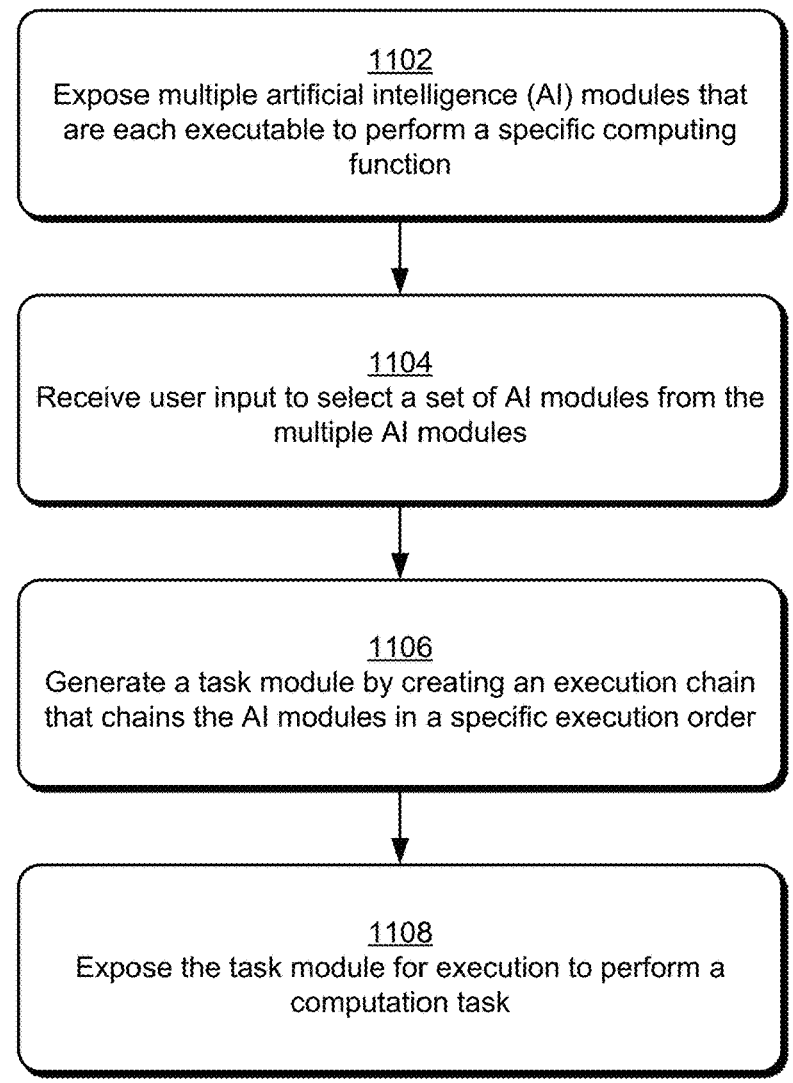
FIG. 11 depicts a method for performing aspects of AI modules for computation tasks in accordance with one or more implementations described herein.

FIG. 11 depicts a method 1100 for performing aspects of AI modules for computation tasks. At 1102, multiple artificial intelligence (AI) modules are exposed that are each executable to perform a specific computing function. Visual indicia identifying the AI modules, for instance, are output, such as via the various GUIs discussed above.

At 1104, user input is received to select a set of AI modules from the multiple AI modules. A user, for instance, selects a subset of individual AI modules from the multiple AI modules.

At 1106, a task module is generated by creating an execution chain that chains the AI modules in a specific execution order. In at least some implementations, a user can specify a particular execution order for the AI modules, and/or the execution order can be automatically generated by the AI manager 110. While implementations are discussed herein with reference to an execution order for a set of AI modules, this is not to be interpreted as limiting execution of a set of AI modules to a serial execution implementation. For instance, techniques described herein can support various iterative and cyclical execution scenarios, such as using backpropagation to train and execute the various task modules generated using the described implementations.

At 1108, the task module is exposed for execution to perform a computation task. The AI manager 110, for instance, outputs a visual indicia of the task module that is selectable to utilize to the task module for performing a computation task.

Figure 12:
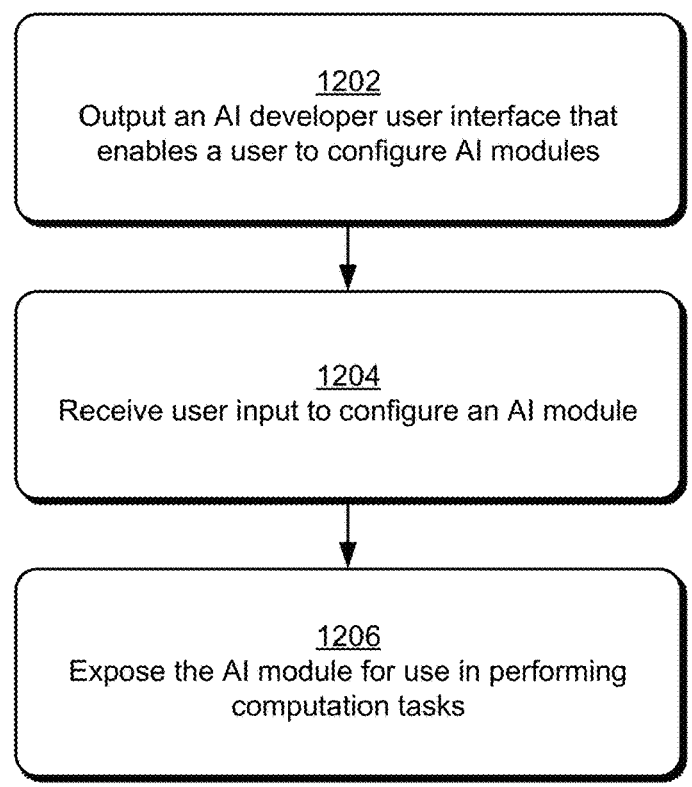
FIG. 12 depicts a method for enabling development of AI modules in accordance with one or more implementations described herein.

FIG. 12 depicts a method 1200 for enabling development of AI modules. At 1202, an AI developer user interface is output that enables a user to configure AI modules. The AI manager 110 and/or a network-based service, for instance, outputs a GUI that enables AI modules to be generated and/or customized.

At 1204, user input is received to configure an AI module. A user, for instance, interacts with the AI developer user interface to generate and/or customize an AI module. In at least one implementation, this includes configuring an AI model to perform different tasks as part of the AI module.

At 1208, the AI module is exposed for use in performing computation tasks. The AI manager 110, for instance, exposes the AI module for use in combination with other AI modules to perform computation tasks. In at least one implementation, a visual indicia of the AI module is output for user selection as part of generating a task module, such as described above.

Accordingly, implementations of AI modules for computation tasks include various ways for enabling different computation tasks to be performed.

The example methods described above may be performed in various ways, such as for implementing different aspects of the systems and scenarios described herein. For instance, aspects of the methods may be implemented by the AI manager 110 on the manager device 104, by the AI client 126 on a client device 106, and/or via interaction between the AI manager 110 and an AI client 126. Further, various aspects of the methods may be implemented via the different GUIs described above. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 13:
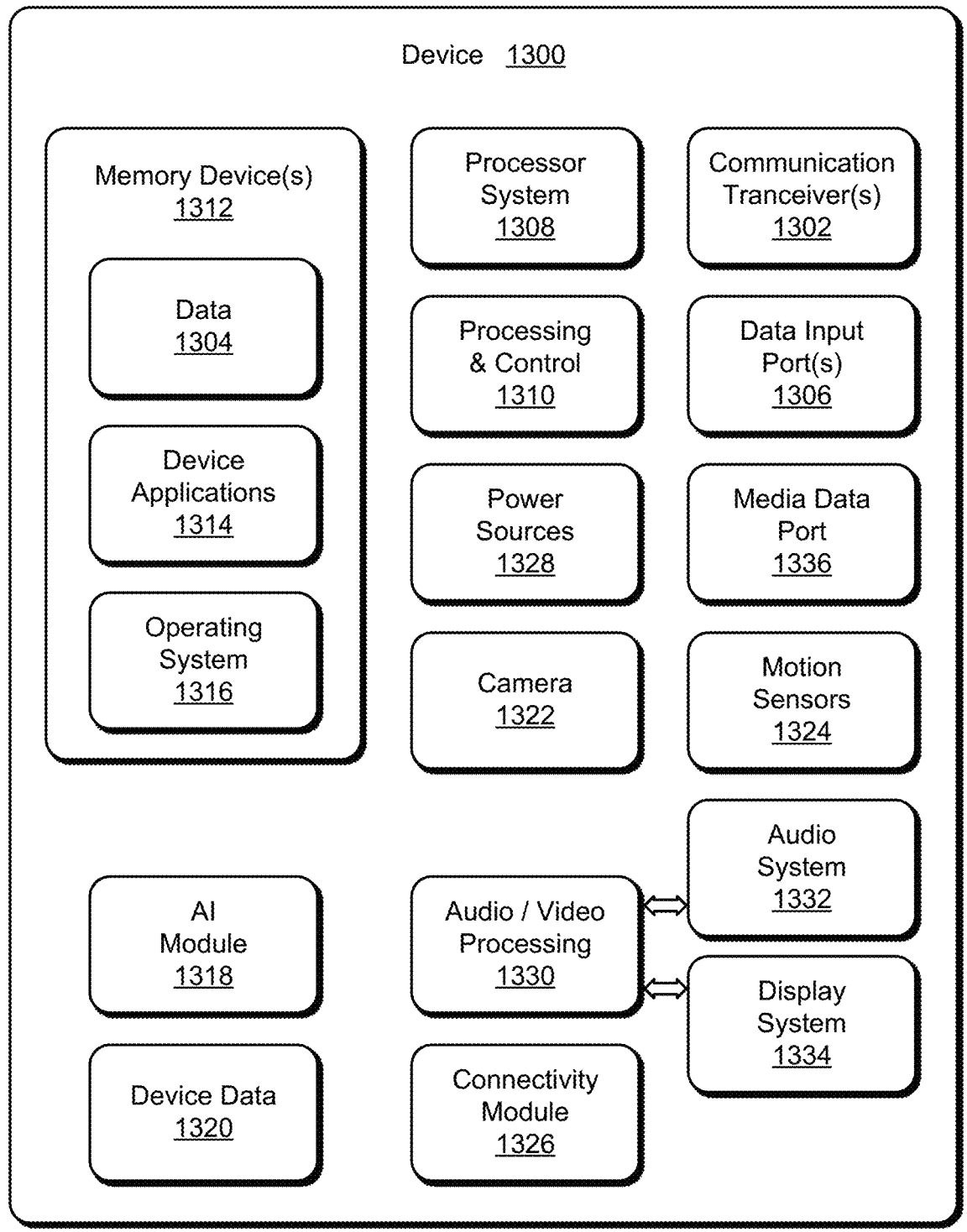
FIG. 13 illustrates various components of an example device that can implement aspects of AI modules for computation tasks.

FIG. 13 illustrates various components of an example device 1300 in which aspects of AI modules for computation tasks can be implemented. The example device 1300 can be implemented as any of the devices described with reference to the previous FIGS. 1-12, such as any type of mobile device, mobile phone, mobile device, wearable device, tablet, computing, communication, entertainment, gaming, media playback, and/or other type of electronic device. For example, the manager device 104 and/or the client devices 106 as shown and described with reference to FIGS. 1-12 may be implemented as the example device 1300.

The device 1300 includes communication transceivers 1302 that enable wired and/or wireless communication of data 1304 with other devices. The data 1304 can include any of device identifying data, device location data, wireless connectivity data, and wireless protocol data. Additionally, the data 1304 can include any type of audio, video, and/or image data, sensor data, etc. Example communication transceivers 1302 include wireless personal area network (WPAN) radios compliant with various IEEE 1302.15 (Bluetooth™) standards, wireless local area network (WLAN) radios compliant with any of the various IEEE 1302.11 (Wi-Fi™) standards, wireless wide area network (WWAN) radios for cellular phone communication, wireless metropolitan area network (WMAN) radios compliant with various IEEE 1302.16 (WiMAX™) standards, and wired local area network (LAN) Ethernet transceivers for network data communication.

The device 1300 may also include one or more data input ports 1306 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1300 includes a processing system 1308 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1310. The device 1300 may further include any type of a system bus or other data and command transfer system that couples the various components within the device. A system bus can include any one or combination of different bus structures and architectures, as well as control and data lines.

The device 1300 also includes computer-readable storage memory 1312 (e.g., memory devices) that enable data storage, such as data storage devices that can be accessed by a computing device, and that provide persistent storage of data and executable instructions (e.g., software applications, programs, functions, and the like). Examples of the computer-readable storage memory 1312 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1300 may also include a mass storage media device.

The computer-readable storage memory 1312 provides data storage mechanisms to store the data 1304, other types of information and/or data, and various device applications 1314 (e.g., software applications). For example, an operating system 1316 can be maintained as software instructions with a memory device and executed by the processing system 1308. The device applications may also include a device manager, such as any form of a control application, software application, signal-processing and control module, code that is native to a particular device, a hardware abstraction layer for a particular device, and so on. Computer-readable storage memory 1312 represents media and/or devices that enable persistent and/or non-transitory storage of information in contrast to mere signal transmission, carrier waves, or signals per se. Computer-readable storage memory 1312 do not include signals per se or transitory signals.

In this example, the device 1300 includes an AI module 1318 that implements aspects of AI modules for computation tasks, and may be implemented with hardware components and/or in software as one of the device applications 1314, such as when the device 1300 is implemented as the client device 106. An example, the AI module 1318 can be implemented as the AI manager 110 and/or the AI client 126 described in detail above. In implementations, the AI module 1318 may include independent processing, memory, and logic components as a computing and/or electronic device integrated with the device 1300. The device 1300 also includes device data 1320 for implementing aspects of AI modules for computation tasks, and may include data from the AI module 1318.

In this example, the example device 1300 also includes a camera 1322 and motion sensors 1324, such as may be implemented in an inertial measurement unit (IMU). The motion sensors 1324 can be implemented with various sensors, such as a gyroscope, an accelerometer, and/or other types of motion sensors to sense motion of the device, e.g., GPS. The various motion sensors 1324 may also be implemented as components of an inertial measurement unit in the device.

The device 1300 also includes a connectivity module 1326, which is representative of functionality to perform various data communication tasks. The connectivity module 1326 represents functionality (e.g., hardware and logic) that enables the client device 106 to communicate data between difference devices, such as client devices in the local environment 102. Generally, the connectivity module 1326 supports communication via a variety of different wired and wireless protocols, such as for data and voice communication. The connectivity module 1326, for instance, includes functionality to support different wireless protocols, such as wireless cellular (e.g., 3G, 4G, 5G), wireless broadband, Wireless Local Area Network (WLAN) (e.g., Wi-Fi), Wi-Fi Direct, Neighborhood Awareness Networking (NAN), wireless short distance communication (e.g., Bluetooth™ (including Bluetooth™ Low Energy (BLE)), Near Field Communication (NFC)), and so forth.

For instance, for the client device 106, the connectivity module 1326 can be leveraged to scan for and detect wireless networks, as well as negotiate wireless connectivity to wireless networks for the client device 106. The device 1300 can also include one or more power sources 1328, such as when the device is implemented as a mobile device. The power sources 1328 may include a charging and/or power system, and can be implemented as a flexible strip battery, a rechargeable battery, a charged super-capacitor, and/or any other type of active or passive power source. Generally, utilizing implementations of AI modules for computation tasks enables the power sources 1328 to be conserved as part of a wireless network connectivity process.

The device 1300 also includes an audio and/or video processing system 1330 that generates audio data for an audio system 1332 and/or generates display data for a display system 1334. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1336. In implementations, the audio system and/or the display system are integrated components of the example device. Alternatively, the audio system and/or the display system are external, peripheral components to the example device.

Although implementations of AI modules for computation tasks have been described in language specific to features and/or methods, the subject of the appended claims is not necessarily limited to the specific features or methods described. Rather, the features and methods are disclosed as example implementations of AI modules for computation tasks, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, including: determining that a particular computation task is to be performed; identifying multiple artificial intelligence (AI) modules that can be combined to perform different computation tasks, each AI module being configured to perform a function pertaining to the different computation tasks; aggregating, based on parameters of the particular computation task, a set of AI modules from the multiple AI modules to generate a task module for performing the particular computation task; and exposing the task module for use in performing the particular computation task.

Alternatively or in addition to the above described method, any one or combination of: wherein said determining is based on a user selection of a computation task category for the computation task, and wherein the multiple AI modules are identified as being configured to perform a function pertaining to the computation task category; wherein one or more of the AI modules include an AI model configured to process data to perform a function pertaining to the AI task; wherein said aggregating includes generating a module chain with the set of AI modules, the module chain representing a specific input/output order for data processing using the set of AI modules; wherein the task module is generated for a particular user, and wherein the method further includes utilizing user-specific data for the particular user to train the task module; wherein the parameters are based on a type of output specified for the computation task, and wherein the set of AI modules is aggregated to provide the specific type of output; further including linking the task module to a particular instance of a client device for which the task module is configured to perform the AI task; further including receiving sensor data from a sensor of the client device for use by the task module in performing the AI task; further including: receiving a task instruction to perform the AI task and a different AI task; identifying a different task module to perform the different AI task, the different task module being generated using a different set of AI modules from the multiple AI modules; and causing the AI task to be performed by the task module and the different AI task to be performed by the different task module.

A system including: one or more processors; and one or more computer-readable storage memory storing instructions that are executable by the one or more processors to: exposing multiple artificial intelligence (AI) modules that are each executable to perform a specific computing function; receiving user input to select a set of AI modules from the multiple AI modules; generating a task module by creating an execution chain that chains the AI modules in a specific execution order; and exposing the task module for execution to perform a computation task.

Alternatively or in addition to the above described system, any one or combination of: wherein said exposing the multiple AI modules includes outputting a graphical user interface (GUI) that includes indicia of the multiple AI modules, and were said receiving user input includes receiving user selection of indicia of the AI modules of the set of AI modules; wherein the specific execution order is based on user input specifying the specific execution order for the AI modules of the task module; wherein the instructions are further executable by the one or more processors to receive a task instruction to perform a particular computation task via the task module, and to implement the task module to perform the computation task by dynamically chaining the AI modules of the task module such that each AI module of the task module performs a different function pertaining to the computation task; wherein the system includes a manager device on a local network, the task instruction is received from a separate client device on the local network, and wherein the task instruction includes an instruction to process sensor data received from the client device, and to return a result of the task instruction from the manager device to the client device.

A method, including: exposing a graphical user interface (GUI) that includes indicia identifying multiple artificial intelligence (AI) modules that are each executable to perform an AI function; receiving user input to the GUI to select a set of AI modules from the multiple AI modules; generating a task module that includes the set of AI modules, the task module specifying an execution order for the task modules of the set of AI modules; and causing an indicia of the task module to be displayed, the task module being executable to perform a computation task.

Alternatively or in addition to the above described method, any one or combination of: further including outputting a training interface that is configured to receive user input to identify a source of training data for training the task module; further including outputting an input interface that is configured to receive input identifying a sensor on a client device for providing input data to perform the computation task; wherein the computation task includes visual object recognition, and wherein the method further includes outputting an object profile interface that enables attributes of a visual object to be specified for recognition; wherein the visual object includes a person's face, and wherein the object profile interface enables a relationship to be specified between a user and a person associated with the user's face; further including outputting a developer interface that enables additional AI modules to be generated for selection via the graphical user interface.

The invention claimed is:

1. A method, comprising:
    determining that a particular computation task is to be performed;
    identifying multiple artificial intelligence (AI) modules that are combinable to perform different computation tasks, each AI module being configured to perform a function pertaining to the different computation tasks;
    aggregating, based on parameters of the particular computation task, a set of AI modules from the multiple AI modules to generate a task module for performing the particular computation task;
    ordering the AI modules of the set of AI modules in the task module based at least in part on an input type for each AI module of the set of AI modules and an output type of each AI module;
    linking the task module to an instance of a client device based at least in part on a mapping of one or more client devices to sensor capabilities of the one or more client devices, the mapping indicating that the client device includes a sensor capable of providing sensor data corresponding to a first input type for a first AI module of the set of AI modules;
    exposing the task module for use in performing the particular computation task; and
    causing the computation task to be performed by the task module to generate an output of the computation task from the task module, including causing the sensor data to be obtained from the client device and causing the sensor data to be provided as the first input type to the first AI module.

2. The method of claim 1, wherein said determining is based on a user selection of a computation task category for the computation task, and wherein the multiple AI modules are identified as being configured to perform a function pertaining to the computation task category.

3. The method of claim 1, wherein one or more of the AI modules include an AI model configured to process data to perform a function pertaining to the AI task.

4. The method of claim 1, wherein said aggregating comprises generating a module chain with the set of AI modules, the module chain representing a specific input/output order for data processing using the set of AI modules.

5. The method of claim 1, wherein the task module is generated for a particular user, and wherein the method further comprises utilizing user-specific data for the particular user to train the task module.

6. The method of claim 1, wherein the parameters are based on a type of output specified for the computation task, and wherein the set of AI modules is aggregated to provide the type of output.

7. The method of claim 1, further comprising:
receiving a task instruction to perform the AI task and a different AI task;
identifying a different task module to perform the different AI task, the different task module being generated using a different set of AI modules from the multiple AI modules; and
causing the AI task to be performed by the task module and the different AI task to be performed by the different task module.

8. The method of claim 1, wherein the ordering the AI modules of the set of AI modules is based at least in part on a suggested ordering, and the method further comprises:
receiving user input to rearrange the suggested ordering to generate a rearranged ordering of the AI modules of the set of AI modules; and
causing the computation task to be performed by the task module according to the rearranged ordering.

9. The method of claim 1, wherein said linking the task module to the instance of the client device is performed based at least in part on a user selection of the client device as an input source for the task module.

10. method of claim 9, wherein the mapping identifies multiple different client devices and multiple different sensor types of the multiple different client devices that are capable of providing multiple different types of sensor data for input to each AI module of the set of AI modules.

11. A system comprising:
one or more processors; and
one or more computer-readable storage memory storing instructions that are executable by the one or more processors to:
exposing multiple artificial intelligence (AI) modules that are each executable to perform a specific computing function, including;
outputting a graphical user interface (GUI) that includes a category region and a module region, the category region identifying different categories of AI modules that are available to perform different AI tasks;
receiving a selection of a category from the category region; and
populating, to the module region, indicia of the multiple AI modules based at least in part on the multiple AI modules being capable of performing aspects of an AI task associated with the selected category;
receiving user input the module region to select a set of AI modules from the multiple AI modules;
ordering AI modules of the set of AI modules based at least in part on an input type for each AI module of the set of AI modules and an output type of each AI module;
generating a task module by creating an execution chain that chains the AI modules of the set of AI modules in a specific execution order and based at least in part on the ordering;
exposing the task module for execution to perform a computation task; and
causing the computation task to be performed by the task module to generate an output of the computation task from the task module.

12. The system of claim 11, wherein the specific execution order is based at least in part on user input to the module region specifying the specific execution order for the AI modules of the task module.

13. The system of claim 11, wherein the instructions are further executable by the one or more processors to receive a task instruction to perform a particular computation task via the task module, and to implement the task module to perform the computation task by dynamically chaining the AI modules of the task module such that each AI module of the task module performs a different function pertaining to the computation task.

14. The system of claim 13, wherein the system comprises a manager device on a local network, the task instruction is received from a separate client device on the local network, and wherein the task instruction comprises an instruction to process sensor data received from the client device, and to return a result of the task instruction from the manager device to the client device.

15. A method, comprising:
outputting a graphical user interface (GUI) that includes a category region and a module region, the category region identifying different categories of AI modules that are available to perform different AI tasks;
receiving user input to the category region to select a category;
populating, to the module region, indicia of multiple AI modules based at least in part on the multiple AI modules being capable of performing aspects of an AI task associated with the selected category;
receiving user input to the module region to select indicia of a set of AI modules from the indicia of multiple AI modules;
ordering the AI modules of the set of AI modules based at least in part on an input type for each AI module of the set of AI modules and an output type of each AI module;
generating a task module that includes the set of AI modules, the task module specifying an execution order for the task modules of the set of AI modules and being ordered based at least in part on the ordering;
causing an indicia of the task module to be displayed, the task module being executable to perform a computation task; and
causing the computation task to be performed by the task module to generate an output of the computation task from the task module.

16. The method of claim 15, further comprising outputting a training interface that is configured to receive user input to identify a source of training data for training the task module.

17. The method of claim 15, further comprising outputting an input interface that is configured to receive input identifying a sensor on a client device for providing input data to perform the computation task.

18. The method of claim 15, wherein the computation task comprises visual object recognition, and wherein the method further comprises outputting an object profile interface that enables attributes of a visual object to be specified for recognition.

19. The method of claim 18, wherein the visual object comprises a person's face, and wherein the object profile interface enables a relationship to be specified between a user and a person associated with the user's face.

20. The method of claim 15, further comprising outputting a developer interface that enables additional AI modules to be generated for selection via the graphical user interface.

* * * * *